May 8, 1928. 1,669,119
E. L. R. BLISS
VALVE STRUCTURE
Filed April 23, 1927
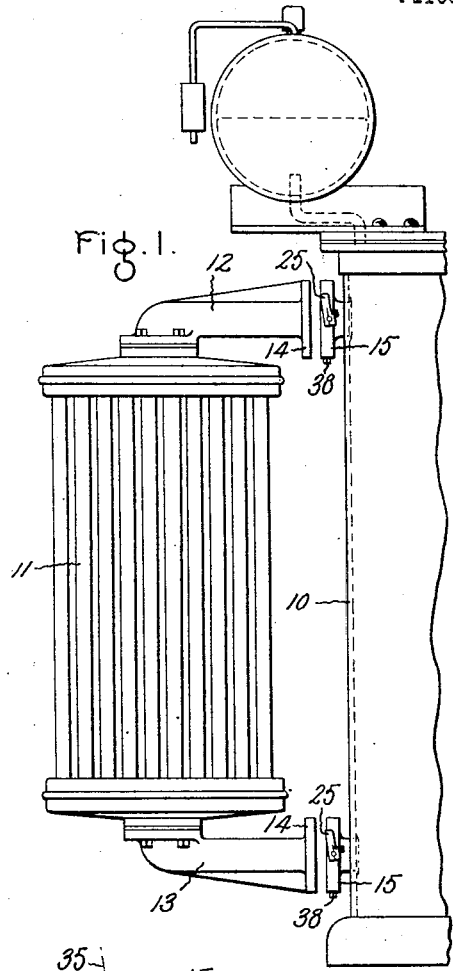
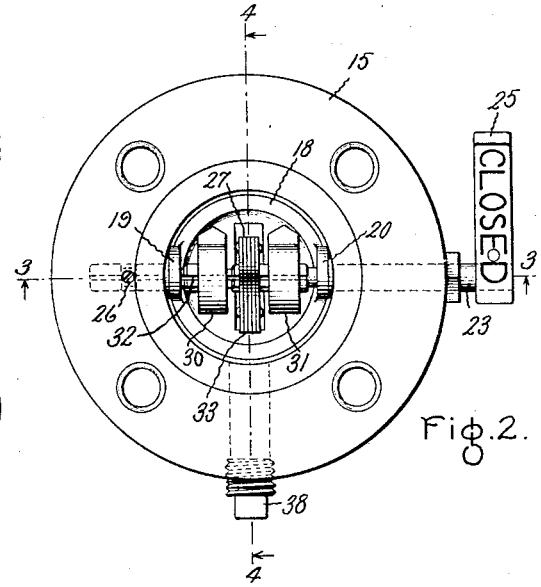
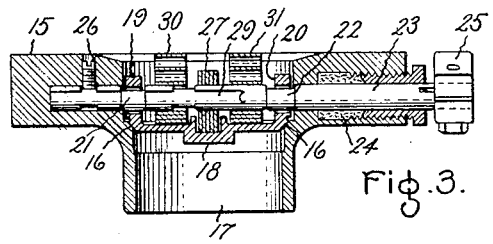
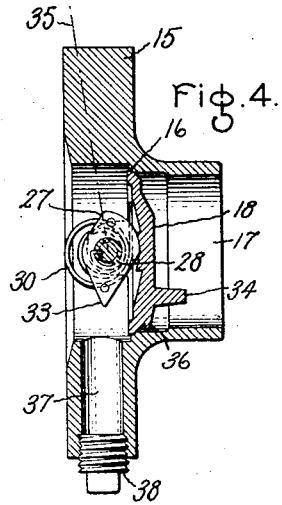
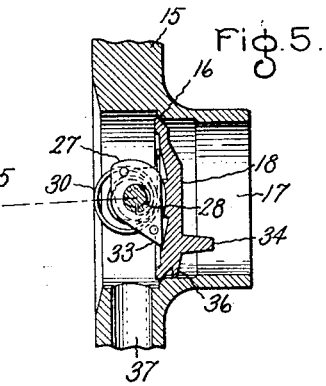
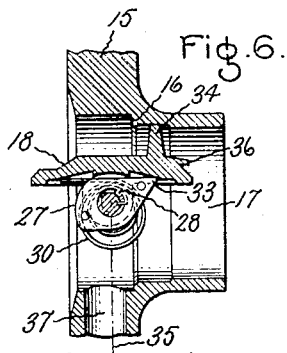
Inventor:
Edwin L.R.Bliss,
by
His Attorney.

Patented May 8, 1928.

1,669,119

UNITED STATES PATENT OFFICE.

EDWIN L. R. BLISS, OF PITTSFIELD, MASSACHUSETTS, ASSIGNOR TO GENERAL ELECTRIC COMPANY, A CORPORATION OF NEW YORK.

VALVE STRUCTURE.

Application filed April 23, 1927. Serial No. 186,118.

My invention relates to valve structures. The general object of the invention is to provide an improved valve structure of compact construction which will act positively and reliably to control the flow of a fluid from one side of the valve to the other.

A particular valve structure comprising the features of the invention will be described as used to control the passageways connecting a heat radiator with the casing of an oil immersed transformer. The valve structure is well adapted for other uses and applications, however, and further objects and advantages will appear from the following description taken in connection with the accompanying drawing in which Fig. 1 indicates the valve structure applied in connection with an oil immersed transformer provided with a heat radiator; Fig. 2 is a face view of the valve structure with the valve proper in closed position; Fig. 3 is a sectional view on the line 3—3 of Fig. 2; Fig. 4 is a sectional view on the line 4—4 of Fig. 2; Fig. 5 is a sectional view similar to Fig. 4 but with the valve proper slightly open; and Fig. 6 is a sectional view similar to Figs. 4 and 5 but with the valve proper fully open.

Like reference characters indicate similar parts in the different figures of the drawing.

One application of a valve structure constructed in accordance with the invention is shown in Fig. 1 of the drawing where the casing 10 of an oil immersed transformer is provided with a heat radiator 11 supported by hollow top and bottom brackets 12 and 13. These brackets with the radiator may be connected to the casing 10 by flanged joints, each joint comprising flanges 14 and 15 which may be bolted together with a gasket between them to prevent leakage of oil. The valve structure is built into each of the flanges 15 nearest the casing 10 so that the oil may be retained in the casing while it is being handled and shipped with the radiator detached. After again attaching the radiator, the valves are opened and the oil permitted to be cooled by flowing through the radiator.

The flange 15 forms the casing of the valve structure. A valve seat 16 surrounds the opening 17 in the casing 15, a valve proper 18 being formed to fit this valve seat when in closed position. The valve proper 18 is provided with two diametrically opposite ears 19 and 20 which loosely surround two eccentric portions 21 and 22 respectively of a rod or shaft 23 journalled in the wall of the casing at opposite sides of the opening 17 and extending transversely through this opening. One end of the shaft 23 projects through an oil tight stuffing box 24 and is provided with an operating handle 25. A set screw 26 engages loosely in a groove near the inner end of the shaft 23 to retain the shaft in proper longitudinal position.

A cam 27 is mounted on the shaft 23 opposite the center of the valve proper 18. This cam 27 has a small inner lug 28 which projects into a longitudinal groove 29 on the shaft 23, the groove 29 being wider than the lug 28, however, so that the cam may be rotated by the shaft but with a certain amount of lost motion. The groove 29 extends from the cam 27 to the inner end of the shaft 23 to permit their assembly. Two spiral springs 30 and 31 surround the shaft 23. one at each side of the cam 27, the inner end of each spring being secured to the shaft by being extended radially inward to engage in a narrow groove 32 in the shaft. The outer ends of the springs 30 and 31 press against the valve proper 18 in a direction to urge it always toward closed position.

The valve proper 18 is shown seated on the valve seat 16 in closed position in Figs. 2, 3 and 4, the position of the cam 27 being such as to press the valve proper into a tight fit against the seat. To open the valve, the shaft 23 is turned by its handle 25 in a counterclockwise direction. This rotates the cam 27 until the valve proper 18 is released. The loose fit between the eccentric portions 21 and 22 of the shaft 23 and the ears 19 and 20 permit these eccentric portions of the shaft to turn freely without disturbing the valve proper until the latter has been released by the cam 27. After its release by the cam 27, however, the eccentric portions 21 and 22 of the shaft 23 engage the ears 19 and 20 and lift the valve proper 18 slightly from its seat 16 as shown in Fig. 5. A projection 33 of the cam 27 then presses against the valve proper 18 to rotate it into fully open position transverse to the valve seat as determined by the stop 34 as shown in Fig. 6. The cam 27 and the projection 33 may be formed on separate members carried by the shaft 23.

The valve seat 16 is beveled so that its surface lies approximately in an imaginary sphere with its center in or close to the shaft 23 or, in other words, the surface of the valve seat 16 is approximately concentric about a point in the axis of rotation of the valve proper. Thus, the valve proper 18 is free to be rotated into open position when raised only slightly from the seat. In each of Figs. 4, 5 and 6, the position of the handle 25 is indicated by a broken line 35. The valve proper 18 is closed by rotating the shaft 23 in the opposite or clockwise direction. As the shaft 23 starts to rotate in this direction from the position shown in Fig. 6, the pressure of the outer ends of the springs 30 against the valve proper 18 holds the latter against the projection of the cam 27 and causes the valve proper to rotate with the shaft 23 until it reaches a position shown in Fig. 5 directly opposite its seat 16 as determined by a stop 36. During this motion of the valve proper 18, it has been held slightly away from its seat 16 by the eccentric portions 21 and 22 of the shaft 23. These eccentric portions of the shaft 23 next release the valve proper 18 so that it may move onto its seat 16. Then, after the lost motion between the shaft 23 and the cam 27 has been taken up, the cam is pressed against the valve proper 18 to force it tightly against its seat as shown in Fig. 4.

As indicated in Figs. 4 and 6, the valve proper 18 preferably rotates through an angle of substantially ninety degrees so that in its open position it will lie parallel to the axis of the opening 17 and thus obstruct it as little as possible. It is also desirable that the angle of rotation of the cam 27 between its extreme positions be not much greater than ninety degrees so that, for purposes of compactness and protection, its projection 33 may remain well within the casing 15 when the valve is in closed position as shown in Fig. 4. For the same reasons, however, the handle 25 and therefore the shaft 23 should rotate through an angle of approximately one hundred eighty degrees so that the handle may lie close to the plane of the casing 15 in either of its extreme positions as indicated by the broken line 35. The lost motion which has been described between the shaft 23 and the cam 27 permits this greater rotation of the shaft and its handle as compared with that of the cam and thus promotes compactness and protection of the inner movable parts of the valve structure.

An outlet opening 37, normally closed by a plug 38, may be provided in the valve casing 15 to permit the radiator 11 to be drained so that it may be detached from the casing 10 for repair or shipment.

The invention has been explained by describing what is now considered the best form thereof but it will be apparent that various changes may be made within the scope of the invention as defined by the appended claims.

What I claim as new and desire to secure by Letters Patent of the United States is:

1. A valve structure including a casing having an opening surrounded by a valve seat, a rotatable shaft mounted transversely of said opening, a valve proper mounted on and loosely fitting said shaft, the portion of said shaft which carries said valve proper being eccentric to raise the valve proper from said seat, and means disconnected from said eccentric portion for rotating said valve with said shaft after it has been raised from its seat.

2. A valve structure including a casing having an opening surrounded by a valve seat, a rotatable shaft mounted transversely of said opening, a valve proper loosely mounted on said shaft, the portion of said shaft which carries said valve proper being eccentric to raise the valve proper slightly from said seat, means for rotating the valve to full open position after it has been raised from its seat, a spring for urging said valve proper toward closed position, and means for forcing said valve proper against said seat when in closed position.

3. A valve structure comprising a casing having an opening surrounded by a valve seat, a rotatable shaft mounted transversely of said opening, a valve proper loosely mounted on said shaft, and projecting means carried by said shaft to rotate said valve proper toward open position, there being a lost motion connection between said shaft and said projecting means.

4. A valve structure comprising a casing having an opening surrounded by a valve seat, a rotatable shaft mounted transversely of said opening, a valve proper loosely mounted on said shaft, and a cam carried by said shaft for forcing said valve proper against said seat when in closed position, said cam having a projection for rotating said valve proper toward open position.

5. A valve structure comprising a casing having an opening surrounded by a valve seat, a rotatable shaft mounted transversely of said opening, a valve proper loosely mounted on said shaft, a spring for urging said valve proper toward closed position, a cam carried by said shaft for forcing said valve proper against said seat when in closed position, and a projection carried by said shaft for rotating said valve proper toward open position.

6. A valve structure comprising a casing having an opening surrounded by a valve seat, a rotatable shaft mounted transversely of said opening, a valve proper loosely mounted on said shaft, the portion of said shaft which carries said valve proper being eccentric to raise the valve proper from said seat, a spring for urging said valve proper toward closed position, a cam carried by said shaft for forcing said valve proper against said seat when in closed position, and a projection carried by said shaft for rotating said valve proper toward open position.

In witness whereof, I have hereunto set my hand this 18th day of April, 1927.

EDWIN L. R. BLISS.